(12) United States Patent
Neukam

(10) Patent No.: US 10,632,899 B2
(45) Date of Patent: Apr. 28, 2020

(54) ILLUMINATION DEVICE FOR A MOTOR VEHICLE FOR INCREASING THE PERCEPTIBILITY OF AN OBSTACLE

(71) Applicant: AUDI AG, Ingolstadt (DE)

(72) Inventor: Johannes Neukam, Pegnitz (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/303,648

(22) PCT Filed: May 22, 2017

(86) PCT No.: PCT/EP2017/062223
§ 371 (c)(1),
(2) Date: Nov. 20, 2018

(87) PCT Pub. No.: WO2017/202750
PCT Pub. Date: Nov. 30, 2017

(65) Prior Publication Data
US 2019/0329699 A1    Oct. 31, 2019

(30) Foreign Application Priority Data

May 24, 2016  (DE) .................... 10 2016 006 390

(51) Int. Cl.
*B60Q 1/08* (2006.01)
*B60W 30/09* (2012.01)
(Continued)

(52) U.S. Cl.
CPC ............. *B60Q 1/085* (2013.01); *B60W 30/09* (2013.01); *B60W 40/04* (2013.01);
(Continued)

(58) Field of Classification Search
None
See application file for complete search history.

(56) References Cited

U.S. PATENT DOCUMENTS

| 4,426,638 A | * | 1/1984 | Donley | ................. | H05K 7/026 |
| | | | | | 315/83 |
| 5,373,219 A | * | 12/1994 | Grabowski | ............. | B60K 6/46 |
| | | | | | 318/139 |

(Continued)

FOREIGN PATENT DOCUMENTS

DE    102010039092 A1    3/2011
DE    102013016904 A1    7/2014
(Continued)

OTHER PUBLICATIONS

International Search Report and Written Opinion of the International Searching Authority directed to related International Patent Application No. PCT/EP2017/062223, dated Sep. 28, 2017, with attached English-language translation; 19 pages.

(Continued)

*Primary Examiner* — Fekadeselassie Girma
(74) *Attorney, Agent, or Firm* — Sterne, Kessler, Goldstein & Fox P.L.L.C.

(57) ABSTRACT

This disclosure relates to an illumination device for a motor vehicle. The illumination device provides a first light beam bundle with a first light distribution for illuminating an environment of the motor vehicle in a first operating mode, and provides a second light beam bundle with a second light distribution for displaying a measurement pattern onto the environment in a second operating mode. The illumination device comprises a control device designed to alternately periodically activate the first operating mode and the second operating mode. This disclosure also relates to a driver assistance system comprising such an illumination device and an image detection unit, as well as a motor vehicle comprising a driver assistance system of this type. This disclosure further relates to a corresponding method.

18 Claims, 2 Drawing Sheets

(51) Int. Cl.
  *B60W 40/04* (2006.01)
  *G06K 9/00* (2006.01)

(52) U.S. Cl.
  CPC ...... *G06K 9/00805* (2013.01); *B60Q 2300/05* (2013.01); *B60Q 2300/32* (2013.01); *B60Q 2300/45* (2013.01); *B60W 2554/00* (2020.02)

(56) References Cited

U.S. PATENT DOCUMENTS

| | | | | |
|---|---|---|---|---|
| 5,486,952 | A * | 1/1996 | Nagao | B60R 1/088 250/205 |
| 5,739,898 | A * | 4/1998 | Ozawa | G03F 7/70125 355/53 |
| 5,942,853 | A * | 8/1999 | Piscart | B60Q 1/085 307/10.8 |
| 6,497,503 | B1 * | 12/2002 | Dassanayake | B60Q 1/085 362/465 |
| 8,749,404 | B2 | 6/2014 | Augst | |
| 8,823,552 | B1 * | 9/2014 | Raphael | B60Q 9/002 340/435 |
| 9,779,561 | B1 * | 10/2017 | Dorrance | G07C 5/0808 |
| 10,068,389 | B1 * | 9/2018 | Strege | G01M 17/007 |
| 10,121,082 | B2 * | 11/2018 | Heisele | B60R 1/00 |
| 10,181,085 | B2 * | 1/2019 | Schamp | G01S 17/46 |
| 10,222,455 | B1 * | 3/2019 | Stieff | G01S 7/4808 |
| 10,240,916 | B1 * | 3/2019 | Golab | G01B 11/275 |
| 10,271,399 | B1 * | 4/2019 | Ekladyous | B60Q 1/2607 |
| 10,473,284 | B2 * | 11/2019 | Bhakta | G02B 26/0833 |
| 10,475,201 | B1 * | 11/2019 | Hall | G06T 7/62 |
| 2003/0169311 | A1 * | 9/2003 | Kong Leong | B41J 11/0095 347/19 |
| 2005/0195074 | A1 * | 9/2005 | Kano | B60Q 1/2665 340/475 |
| 2007/0133113 | A1 * | 6/2007 | Minabe | G11C 13/042 359/872 |
| 2007/0137691 | A1 * | 6/2007 | Cobb | F24S 23/82 136/246 |
| 2007/0241874 | A1 * | 10/2007 | Okpysh | B60Q 1/444 340/479 |
| 2009/0086501 | A1 * | 4/2009 | Devir | H01K 1/14 362/519 |
| 2009/0299577 | A1 * | 12/2009 | Demant | B60R 22/48 701/45 |
| 2010/0182311 | A1 * | 7/2010 | Kim | H04N 13/254 345/419 |
| 2012/0050074 | A1 * | 3/2012 | Bechtel | B60R 1/04 340/988 |
| 2013/0083532 | A1 * | 4/2013 | Chen | H05B 45/37 362/249.02 |
| 2014/0104574 | A1 * | 4/2014 | Grenon | A61B 3/101 351/206 |
| 2014/0347470 | A1 * | 11/2014 | Zhang | B60R 1/00 348/118 |
| 2015/0109597 | A1 * | 4/2015 | Schmitt | G02B 5/3025 355/71 |
| 2015/0131324 | A1 * | 5/2015 | de Lamberterie | G02B 6/0035 362/623 |
| 2015/0138505 | A1 * | 5/2015 | Grenon | A61B 3/101 351/206 |
| 2016/0035223 | A1 * | 2/2016 | Gutmann | G08G 1/096725 340/907 |
| 2016/0377252 | A1 * | 12/2016 | Bhakta | F21S 41/675 362/520 |
| 2017/0261315 | A1 * | 9/2017 | Yamaguchi | G01C 21/28 |
| 2018/0118099 | A1 * | 5/2018 | Kunii | B60Q 1/503 |
| 2019/0097722 | A1 * | 3/2019 | McLaurin | H01S 5/4012 |
| 2019/0104285 | A1 * | 4/2019 | Medvec | H04N 9/3161 |

FOREIGN PATENT DOCUMENTS

| | | |
|---|---|---|
| DE | 102013019021 A1 | 5/2015 |
| DE | 102014100579 A1 | 7/2015 |
| DE | 102015008774 A1 | 1/2017 |
| EP | 1628141 A1 | 2/2006 |
| EP | 2595091 A1 | 5/2013 |
| WO | WO 2013/117923 A1 | 8/2013 |

OTHER PUBLICATIONS

International Preliminary Report on Patentability directed to related International Patent Application No. PCT/EP2017/062223, dated May 4, 2018, with attached English-language translation; 28 pages.

* cited by examiner

ILLUMINATION DEVICE FOR A MOTOR VEHICLE FOR INCREASING THE PERCEPTIBILITY OF AN OBSTACLE

TECHNICAL FIELD

This disclosure relates to an illumination device for a motor vehicle, a driver assistance system with such an illumination device, and a motor vehicle with a corresponding driver assistance system. This disclosure also relates to a method for operating an illumination device of a motor vehicle.

BACKGROUND

Modern motor vehicles, for example motor vehicles with combustion engines or electric vehicles or hybrid vehicles, depend on the use of ultrasound, radar, and/or stereo camera sensors for the generation of a virtual image of the three-dimensional environment of the motor vehicle. Many driver assistance systems work on the basis of values measured in this way.

As the number of sensors increases, the amount of the environmental data increases more and more as well. This means that information in areas in the environment of the motor vehicle can be analyzed that was previously not ascertainable. Consequently, the motor vehicle is provided with a wide-ranging overview of its environment. In addition, the combination of several measuring sensors in highly significant areas helps achieve redundancy and increased precision in the collection of data.

In this context, a method for the determination of the distance of an object from a vehicle is known from DE 10 2010 039 092 A1, in which a picture is taken of the surroundings in front of or behind the vehicle in the infrared wavelength range or in another wavelength range that cannot be perceived by the human eye. Furthermore, EP 1 628 141. A1 proposes a method for detecting and determining the distance of objects in the front of a motor vehicle by means of a mono-camera, whereby the mono-camera in the front of the vehicle is associated with at least two measuring beam emitters that emit measuring beams in a defined illumination pattern. In addition, a system is known from DE 10 2014 100 579 A1 for generating information on a projection surface in front of a motor vehicle, comprising an illumination device, a detection means, and an evaluation means, whereby the illumination device is designed to detect the light reflected by the projection surface.

The patent application DE 10 2013 016 904 A1 describes a lighting unit for a vehicle and a method for operating a lighting unit. To adjust a light distribution by means of a control unit, information can be sent to a light source module by means of a base-light distribution that can be adjusted. The adjustment of the light distribution and the operating parameters is performed here in particular automatically depending on an actual driving situation of the motor vehicle. This is determined by the control unit from state variables Z. The base-light distribution can be converted to a new desired light distribution by means of several functions such as an aperture function with four to six parameters.

The patent application WO 2013/117923 A1 describes an illumination unit for car headlights with a phase modulator. This illumination device is designed to provide controllable light beams for illuminating a scene. The illumination device comprises a spatial light phase modulator. With it, a light beam with a phase shift to the incident light can be generated. The illumination device further comprises a Fourier optic to receive the phase-modulated light from the spatial light modulator and to generate a new light distribution from it. The illumination device also comprises a projection optic to represent the light distribution.

At the moment, objects in front of the motor vehicle, in particular in a projected travel area, are detected and evaluated by means of a camera, for example. The continuous development of intelligent algorithms in the area of image processing makes the detection of obstacles and their removal possible, even though the camera sensor only provides a two-dimensional image for the evaluation which lacks depth data. For the evaluation, the manufacturer of a motor vehicle depends on the assumption that, in the automated evaluation, obstacles are correctly detected and interpreted. This constitutes a potential source of error.

Particularly when it is dark, the silhouettes and contours of an object in the travel range of the motor vehicle are more difficult to detect for a camera-based driver assistance system than during the day with a comparatively homogeneously lit environment.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
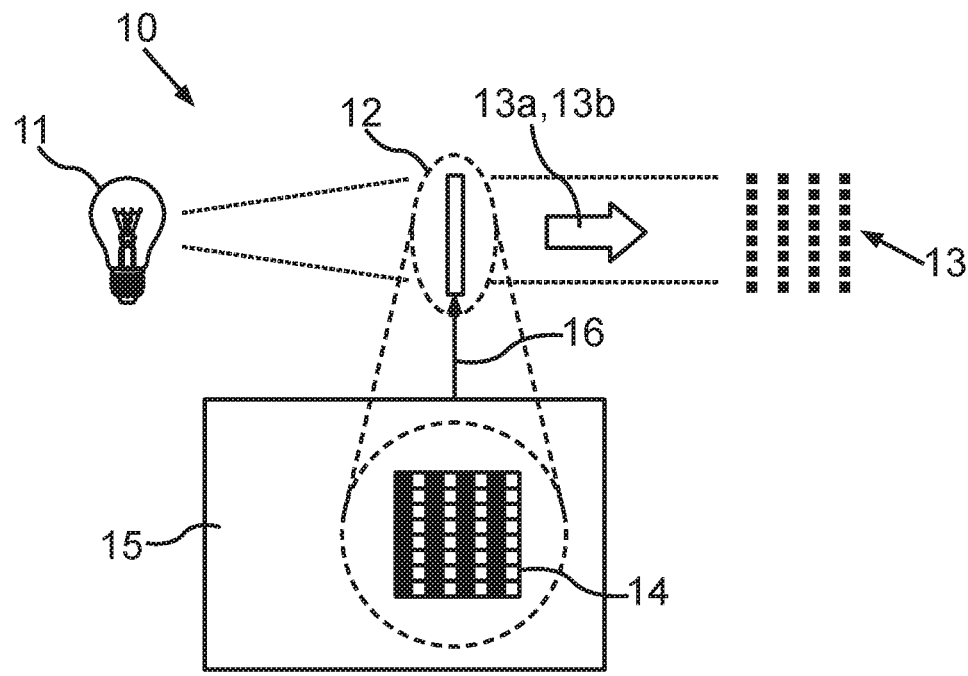
FIG. 1 illustrates, in a simplified schematic, a preferred first exemplary embodiment of an illumination device.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally, similar elements.

DETAILED DESCRIPTION

The object of this disclosure is to provide an illumination device for a motor vehicle, a driver assistance system, and a motor vehicle, as well as a method with which the perceptibility of an obstacle is improved.

This object is solved by an illumination device, by a driver assistance system, by a motor vehicle, and by a method as disclosed herein and by the independent claims. Preferred embodiments are the subject matter of the dependent claims.

An illumination device for a motor vehicle is designed to provide a first light beam bundle with a first light distribution for illuminating an environment of the motor vehicle in a first operating mode, and a second light beam bundle with a second light distribution for displaying a measurement pattern onto the environment in a second operating mode.

The illumination device furthermore comprises a control device designed to alternately periodically activate the first operating mode and the second operating mode.

By displaying a measurement pattern onto the environment using an image detection unit, in particular a camera with a CCD sensor or a CMOS sensor, a spatial model of the environment can be constructed on the basis of the measurement pattern captured by a two-dimensional image recording. The measurement pattern is therefore projected onto the road surface in recurring intervals. To prevent a driver from perceiving the measurement pattern as distracting, the frequency of the periodic sequence is advantageously selected in such a way that the driver of the motor vehicle does not notice the display of the measurement pattern. Furthermore, the second operating mode in a sequential period may be activated for a much shorter period of time than the first operating mode. This way, an interfering influence by the reproduction of the measurement pattern on the driver of the motor vehicle may be substantially reduced and, at the same time, most of the performance that the illumination device can provide can be made available. A preferable option may be to provide the second operating mode with a maximum time percentage of 10%. This would correspond to an average light output of 90% to <100%.

According to a preferred further development, the illumination device comprises a shared light source configured to generate the first light beam bundle in the first operating mode and the second light beam bundle in the second operating mode. This has the advantage that existing components of the vehicle can be used. In particular, additional measuring beams, as they are disclosed, for example, in DE 10 2010 039 092 A1 and EP 1 628 141 A1, are not necessary. By using the existing components in the motor vehicle, therefore, the same spectrum is used in a preferable manner for the first light beam bundle and the second light beam bundle. The spectrum is, in particular, in the visible range, whereby the spectral composition preferably produces white light. In particular, the first light beam bundle and the second light beam bundle may be transmitted via the same optical path. That means that the first light beam bundle and the second light beam bundle have the same beam path. A light output surface of the illumination device can, in this manner, be kept small, for example through a projection lens, which makes a compact build possible. The light source may be realized by a laser light source, particularly in the form of one or more laser diodes. Preferably, the laser light source emits in the blue spectral range, whereby white light is generated by using a luminescence converter. Other types of light sources may be used as well, of course, for example light-emitting diodes (LED).

According to a preferred embodiment, the illumination device comprises a point-by-point controllable light modulation unit for forming the first light beam bundle and/or the second light beam bundle from a plurality of individually adjustable beams correlating with a respective pixel, whereby the control device, to activate the first operating mode and/or the second operating mode, is configured to provide an image signal, in particular a video signal, to the light modulation unit. The light modulation unit may, for example, be formed by an active matrix display as it is known from the use for liquid crystal display screens and/or projectors (LCD, liquid crystal display). In the process, an LCD matrix is brought into the beam path, whereby the transmittance of each individual matrix pixel can be adjusted with a respective control signal. This way, a point-by-point controllable aperture can be realized. An alternative realization of the light modulation unit may be performed using a mirror matrix. This component, known as a Digital Micromirror Device (DMD), is, for example, a central component of so-called DLP (digital light processing) projectors. It is a spatial light modulator that consists of digital micromirror devices that are arranged in the form of a matrix, i.e., tiltable reflecting surfaces that are moved under the influence of electrostatic fields. Each micromirror can be individually adjusted in its angle and generally has two stable end states. The first light distribution or the second light distribution of the first and/or second light beam bundle that is guided to the environment depends, in this case, on the arrangement of the micromirrors that are found in the respective tilted position.

Particularly preferred is the illumination device that is configured as a high-resolution automotive headlight with a resolution of at least 320,000 pixels, more preferred of at least 360,000 pixels, and especially preferred of at least 400,000 pixels, for the generation of the first light beam bundle and/or the second light beam bundle. The high-resolution headlights of future motor vehicles that are introduced to better illuminate the road and to interact with other road users therefore receive a further technical support function. These types of high-resolution headlights can be controlled using a video stream. This way, individual frames with measurement patterns can be embedded easily and without additional effort. Even a repeated inversion of defined areas is possible with these types of vehicle headlights without any limitations.

The first operating mode and the second operating mode may overlap with regard to their functional purpose. A measurement pattern may overlap with the first light distribution for the illumination of the environment of the motor vehicle in the first operating mode, which is inversely formed to the measurement pattern of the second light distribution. When this principle is fully applied, operating modes can therefore alternatively be used for displaying a measurement pattern with a defined frequency in which the individual pixels of the first light distribution and of the second light distribution are at least partially positioned inversely to each other. In this case, the ratio between the duration of the first operating mode and the duration of the second operating mode within a period of the sequence is of little consequence. The human eye averages the brightness of the activation as well. A resolution of the different individual images is possible using an image acquisition unit. If enough light output from the illumination device is available, the measurement pattern can be generated even up to 100% of the time. To this purpose, a measurement pattern formed from stripes can, for example, be shown inversely in every second image. A homogeneous, integrated light distribution is created in the eye of a viewer.

Preferably, a driver assistance system for a motor vehicle may comprise an illumination device as well as an image detection unit that is configured to determine image data depending on the environment of the motor vehicle illuminated by the first light beam bundle and/or the second light beam bundle. The image detection unit may preferably be synchronized with the period sequence of the first operating mode and the second operating mode.

According to a preferred further development, the driver assistance system comprises an evaluation unit that is configured to determine the presence of an obstacle in the environment of the motor vehicle from the image data. The measurement pattern projected in recurring intervals onto the road can thus be recorded by the image detection unit that is operated in a synchronized manner, for example, by a camera installed close to the inside rear view mirror of the motor vehicle, in the form of an image of the illuminated area of the road, and forwarded to the evaluation unit. The evaluation unit compares the emitted measurement pattern with the image that was captured and calculates, on the basis of the pattern deformation and the expected values for the diffusion of the light, whether there are obstacles on the road and what form as well as what distance these have. In addition to the deformation of the patterns, their thickness may provide another indication of the geometry of the object observed. An evaluation of the measurement pattern therefore makes it possible to generate a three-dimensional image of the environment. The information additionally collected by the evaluation unit can therefore preferably be used to increase the precision of the measurement of other sensors arranged in the motor vehicle.

According to a preferred further development of the driver assistance system, the evaluation unit is configured to provide a correction signal that controls the steering system and/or brake system of the motor vehicle depending on the position of an Obstacle detected within the environment of the motor vehicle. This way, the obstacles determined by the evaluation unit may be directly used by the driver assistance system to correct the travel path and/or the speed of the motor vehicle, whereby an additional increase in safety is achieved.

Preferably, a motor vehicle may comprise the disclosed driver assistance system. The motor vehicle may have a combustion motor and/or an electric motor as a drive engine. In particular, the motor vehicle may be configured to provide automatic speed control and/or track guidance control. The driver assistance system may preferably be used in a fully automated drive mode of the motor vehicle.

A method for the operation of a motor vehicle provides a first light beam bundle in a first operating mode with a first light distribution for the illumination of an environment of the motor vehicle, and a second light beam bundle in a second operating mode with a second light distribution for the reproduction of a measurement pattern onto the environment. The method is further developed by an alternating activation of the first operating mode and the second operating mode in a period sequence.

According to a preferred further development, the method includes the detection of image data depending on the environment of the motor vehicle illuminated with the first light beam bundle and/or with the second light beam bundle, in particular as a sequence of images synchronized with the first operating mode and/or with the second operating mode. Thereby, depending on the intended use, different image data may be provided, for example, for the evaluation unit for the detection of obstacles depending on the environment of the motor vehicle illuminated with the second light beam bundle or, for example, for the provision of a display unit, for example a screen in the interior of the motor vehicle on the basis of image data that was determined depending on the environment illuminated with the first light beam bundle.

According to a preferred arrangement of the method, the measurement pattern is formed in a striped or lattice pattern. The striped light projection is used to measure objects and surfaces, the data of which is converted to CAD models. Here, a striped pattern is applied to the object to be investigated by the light source and simultaneously captured by a camera. Based on the deformation of the previously defined light/shadow pattern on the object, a computer program is used to calculate its geometry. A striped or lattice pattern therefore offers a suitable basis for the analysis of a 3D contour of an object or a surface. Preferably, in the second operating mode, not just a single measurement pattern, but several measurement patterns can be retrieved in an iterative sequence each time the second operating mode is activated. It is especially preferred if two striped patterns may be alternately activated whose stripe orientations are orthogonal to each other. Regardless of that, however, the distance of the illuminated stripes and/or the width of the illuminated stripes may be periodically varied. It may also be provided that at least one of the subsequent parameters of the striped pattern is time and/or index-dependent (indexed by the numbering of the current period of the sequence), the parameters including orientation of the striped pattern, distance of the striped pattern, and width of the striped pattern. By varying one or more of these parameters, a maximum detail depth may be reached.

The advantages described herein for the illumination device and its preferred embodiments apply as well to the driver assistance systems and the motor vehicle. The advantages and features for the devices and their embodiments apply equally to the corresponding methods, and vice versa. Consequently, corresponding method features may be provided for device features, and vice versa.

The features and feature combinations referenced above in the description as well as the features and feature combinations referenced below in the description of the figures and/or the figures themselves can be used not only in the combination stated but in other combinations or by themselves without exceeding the scope of this disclosure. Consequently, embodiments must be considered as disclosed that are not explicitly shown or explained in the figures, but that result from and can be created by using a different feature combination.

Further advantages and features are outlined in the following descriptions of exemplary, embodiments in consideration of the corresponding figures. In the figures, the same reference numerals refer to the same features and functions.

FIG. 1 shows, in a simplified schematic illustration, a preferred first exemplary embodiment of an illumination device.

Figure 2:
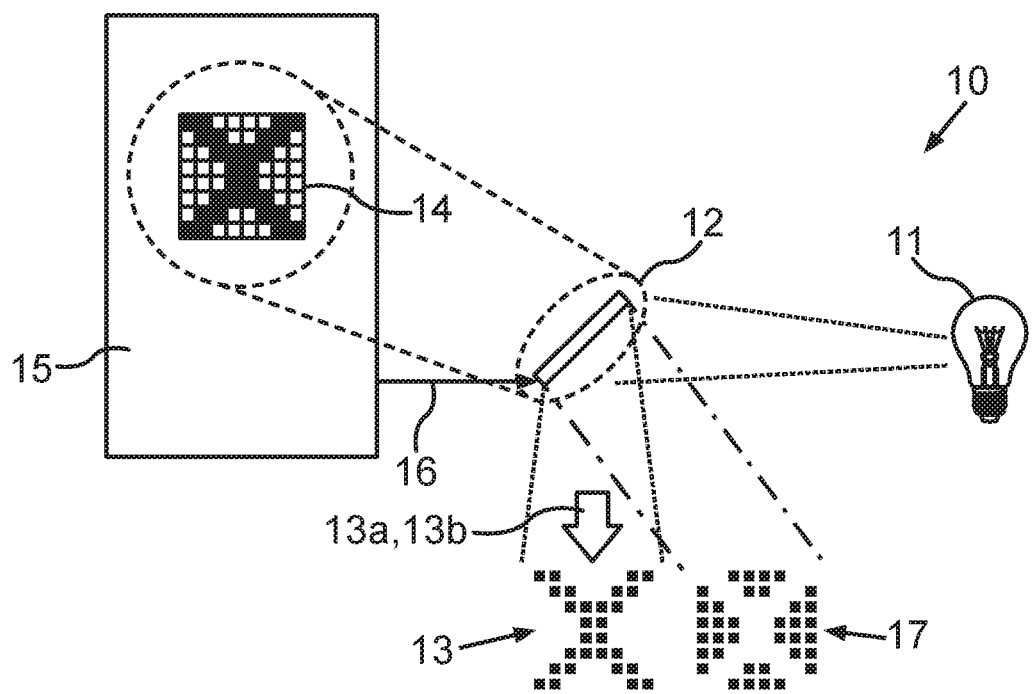
FIG. 2 illustrates, in a simplified schematic, a preferred second exemplary embodiment of an illumination device.

FIG. 2 shows, in a simplified schematic illustration, a preferred second exemplary embodiment of an illumination device.

Figure 3:
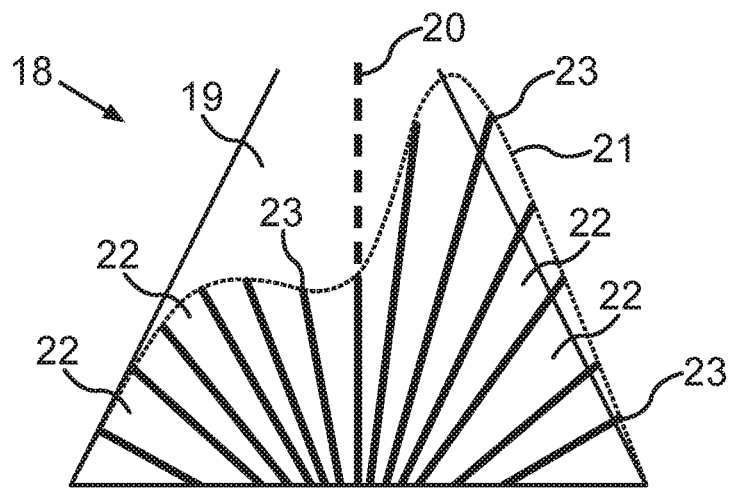
FIG. 3 illustrates, in a simplified schematic, an environment of a motor vehicle illuminated with the illumination device, without an obstacle.

FIG. 3 shows, in a simplified schematic illustration, an environment of a motor vehicle illuminated by the disclosed illumination device, without an obstacle.

Figure 4:
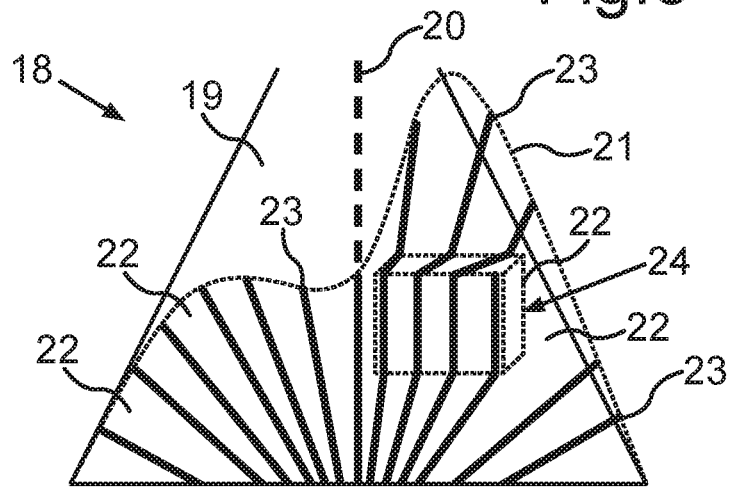
FIG. 4 illustrates, in a simplified schematic, an environment illuminated with the illumination device, with a box-shaped obstacle.

FIG. 4 shows, in a simplified schematic illustration, an environment illuminated by the disclosed illumination device, with a box-shaped obstacle.

Figure 5:
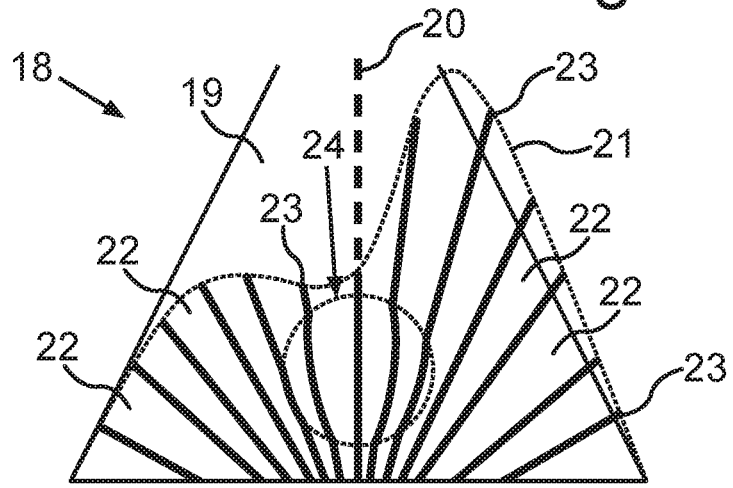
FIG. 5 illustrates, in a simplified schematic, an environment illuminated with the illumination device, with a ball-shaped obstacle.

FIG. 5 shows, in a simplified schematic illustration, an environment illuminated by the disclosed illumination device, with a ball-shaped obstacle.

An illumination device 10 comprises, according to a preferred first embodiment as shown in FIG. 1, a light source 11 that sends light onto a light modulation unit 12. The light modulation unit 12 is designed as a liquid crystal display (LCD). The light modulation unit 12 comprises a plurality of individual elements arranged in the form of a matrix that are each assigned to a single pixel. Depending on an image signal 16, which is provided by a control device 15, the individual pixels can be put in a permeable (transmissive) state or in an impermeable, in particular absorbing, state. This way, the illumination device 10 creates the resulting light pattern 13, which is correlated with a control pattern 14 that is generated by the control device 15, and that is provided by the image signal 16 to the light modulation unit 12.

In a periodic sequence, the control device 15 alternately activates a first operating mode and a second operating mode, whereby in the first operating mode a first light beam bundle 13a with a first light distribution is provided to illuminate an environment of the motor vehicle, and in a second operating mode a second light beam bundle 13b with a second light distribution is provided to display a measurement pattern onto the environment. The control pattern 14 that was chosen for the illustration of FIG. 1 as an example corresponds here to the second light distribution of the second light beam bundle 13b with a stripe-shaped measurement pattern.

According to a preferred embodiment as shown in the illustration of FIG. 2, the light modulation unit 12 is formed by a micromirror array. The light source 11 as well as the control device 15, which provides the image signal 16 to the light modulation unit 12, corresponds to the configuration of the first exemplary embodiment. To better illustrate the operating mode of a micromirror array, the control pattern 14 is shown in the form of a cross. This does not have a limiting effect on the embodiment. Furthermore, a cross may be considered the most primitive form of a lattice formed from two single stripes.

The position of the individual micromirrors, which are arranged on the light modulation unit 12 in the form of a matrix, correlates with the control pattern 14. Consequently, the first light beam bundle 13a or respectively the second light beam bundle 13b is steered in the direction of the resulting light pattern 13. As already shown in the previous illustration, the resulting light pattern 13 and/or the control pattern 14 represent(s) a measurement pattern used for the second operating mode. A hidden light pattern 17 forms the illustration that complements the control pattern 14 and therefore the resulting light pattern 13 as well. The hidden light pattern 17 is therefore the negative of the resulting light pattern 13. The light beams directed toward the hidden light pattern 17 are preferably diverted to a so-called light trap in which the light is absorbed and undesired reflections suppressed. With such a Digital Micromirror Device (DMD), which comprises a matrix of hundreds of thousands of micromirrors, each individual micromirror can be tilted up to 5,000 times per second by electrostatic fields. The micromirror array therefore also facilitates a corresponding temporal modulation, for example, by using a pulse width control with the setting of effective interim values in each of the two operating modes between a light beam that is completely directed toward the resulting light pattern 13 and a light beam that is completely directed toward the hidden light pattern 17, for the realization of any given brightness level, e.g., a gray level instead of a pure black-and-white level.

The black rectangles of the resulting light pattern 13 represent, in both FIG. 1 and in FIG. 2, the nonilluminated/dark areas.

FIG. 3 shows an environment 18 of a motor vehicle with a road surface 19, to the center of which a median stripe 20 is applied. The first light beam bundle 13a known from FIGS. 1 and 2 comprises a first light distribution 21, which shows the cone-shaped course that is typical for a motor vehicle. The dual cone results from the superimposition of two individual headlights. Preferably, both individual headlights are adapted to each other in such a way that an almost offset-free coverage of a second light distribution 22 with dark stripes 23 results in the overlapping area. To achieve a clearer illustration, the reference numeral for the first light distribution 21 is shown at the delimitation line of the illuminated area. The first light distribution 21 within this delimitation line is considered homogeneous, aside from a change caused by the respective optic (projection lens) of the respective vehicle headlight, which affects the first light beam bundle 13a with the first light distribution 21 in the same way as the second light beam bundle 13b with the second light distribution 22, The second light distribution 22 comprises the entire area within the delimitation line that delimits the first light distribution 21 minus the dark stripes 23, which are only provided with exemplary reference numerals in the same way as the second light distribution 22. The illumination device 10 therefore generates a pattern that is applied to the road surface 19. The dark stripes 23 constitute areas without headlight illumination, Without obstacles, the simplified and exemplary light distribution as shown in FIG. 3 can be seen. Starting from the lower horizontal line that represents the focal point of the motor vehicle, the light cone that illuminates the dark road is interrupted by dark lines, i.e., areas in which the light is currently turned off. Shown in the background is the nonilluminated road surface 19 including the median stripe 20. The dark patterns of the headlights extend here linearly in the direction of the horizon up to the delimitation line denoting the first light distribution 21. Beyond this delimitation line, the road surface 19 is not illuminated aside from potentially occurring stray light, which does not have any illuminating function.

In the illustration of FIG. 4, an obstacle 24 in the shape of a box is added to the arrangement from FIG. 3. The shape of the second light distribution 22 and the dark stripes 23 that are interfered with in the area of the obstacle 24, compared to their linear course shown in FIG. 3, can be captured by an image detection unit installed on or in the motor vehicle. From the deformation of the dark stripes 23, which denote gaps in the second light distribution 22, an evaluation unit of the motor vehicle is able to calculate the dimensions of and the distance from the obstacle 24.

Accordingly, FIG. 5 shows the environment 18 of a motor vehicle which is illuminated with an illumination device 10, whereby, in this case, the obstacle 24 consists of a ball-shaped object. The corresponding exemplary deformation of the light/dark pattern, provided by the second light distribution 22 and interrupted by the dark stripes 23, can be captured accordingly by the vehicle's image detection unit (e.g., camera).

The data determined in this way by the camera and/or the evaluation device regarding a dimension and/or distance of an obstacle 24 can be combined with data from other sensors in the motor vehicle to achieve higher precision in the detection of obstacles 24. Furthermore, the data may be shared with other drivers, for example, via a so-called Car2Car communication or Car2X communication.

The purpose of the exemplary embodiments is to further explain the disclosure but not limit the same. In particular, the type and the number of the measurement patterns may vary without changing the spirit of the disclosure.

It was therefore shown above and in the following claims how a striped light topology can be used by high-resolution headlights to detect obstacles.

The invention claimed is:
1. An illumination device for a motor vehicle, the illumination device configured to:
generate, in a first operating mode, a first light beam bundle having a first light distribution for illuminating an environment of the motor vehicle and for displaying a first measurement pattern onto the environment; and generate, in a second operating mode, a second light beam bundle having a second light distribution for displaying a second measurement pattern onto the environment, wherein the illumination device comprises a control device having at least one processor configured to alternately periodically activate the first operating mode and the second operating mode, wherein the first measurement pattern is formed inversely to the second measurement pattern, and wherein the illumination device further comprises a point-by-point controllable light modulation unit configured to form the first light beam bundle or the second light beam bundle from a plurality of individually adjustable beams correlated with a respective pixel, and wherein the at least one processor of the control device is further configured to provide an image signal to the point-by-point controllable light modulation unit to activate the first operating mode or the second operating mode.

2. The illumination device of claim 1, further comprising a shared light source configured to generate the first light beam bundle in the first operating mode and the second light beam bundle in the second operating mode.

3. The illumination device of claim 1, wherein the image signal is a video signal.

4. The illumination device of claim 1, configured as a high-resolution vehicle headlight having a resolution of at least 320,000 pixels for the generation of the first light beam bundle or the second light beam bundle.

5. The illumination device of claim 1, configured as a high-resolution vehicle headlight having a resolution of at least 360,000 pixels for the generation of the first light beam bundle or the second light beam bundle.

6. The illumination device of claim 1, configured as a high-resolution vehicle headlight having a resolution of at least 400,000 pixels for the generation of the first light beam bundle or the second light beam bundle.

7. A driver assistance system for a motor vehicle, the driver assistance system comprising:
an illumination device configured to:
generate, in a first operating mode, a first light beam bundle having a first light distribution for illuminating an environment of the motor vehicle and for displaying a first measurement pattern onto the environment; and
generate, in a second operating mode, a second light beam bundle having a second light distribution for displaying a second measurement pattern onto the environment,
wherein the illumination device comprises a control device having a first processor configured to alternately periodically activate the first operating mode and the second operating mode, wherein the first measurement pattern is formed inversely to the second measurement pattern,
an image detection unit, comprising a second processor configured to capture image data depending on the environment of the motor vehicle illuminated by the first light beam bundle or by the second light beam bundle; and
a point-by-point controllable light modulation unit configured to form the first light beam bundle or the second light beam bundle from a plurality of individually adjustable beams correlated with a respective pixel, wherein the first processor of the control device is further configured to provide an image signal to the point-by-point controllable light modulation unit to activate the first operating mode or the second operating mode.

8. The driver assistance system of claim 7, further comprising an evaluation unit, wherein the evaluation unit comprises a third processor configured to determine a presence of an obstacle in the environment of the motor vehicle from the image data.

9. The driver assistance system of claim 8, the third processor of the evaluation unit further configured to provide a correction signal depending on a position of the determined obstacle within the environment of the motor vehicle, wherein the correction signal is provided to activate a steering system or a brake system of the motor vehicle.

10. The driver assistance system of claim 7, wherein the illumination device further comprises:
a shared light source configured to generate the first light beam bundle in the first operating mode and the second light beam bundle in the second operating mode.

11. A motor vehicle having a driver assistance system comprising:
an illumination device configured to:
generate, in a first operating mode, a first light beam bundle having a first light distribution for illuminating an environment of the motor vehicle and for displaying a first measurement pattern onto the environment; and
generate, in a second operating mode, a second light beam bundle having a second light distribution for displaying a second measurement pattern onto the environment,
wherein the illumination device comprises a control device having a first processor configured to alternately periodically activate the first operating mode and the second operating mode, wherein the first measurement pattern is formed inversely to the second measurement pattern;
an image detection unit, comprising a second processor configured to capture image data depending on the environment of the motor vehicle illuminated by the first light beam bundle or by the second light beam bundle; and
a point-by-point controllable light modulation unit configured to form the first light beam bundle or the second light beam bundle from a plurality of individually adjustable beams correlated with a respective pixel,
wherein the first processor of the control device is further configured to provide an image signal to the point-by-point controllable light modulation unit to activate the first operating mode or the second operating mode.

12. The motor vehicle of claim 11, wherein the driver assistance system further comprises an evaluation unit having a third processor configured to determine a presence of an obstacle in the environment of the motor vehicle from the image data.

13. The motor vehicle of claim 12, the third processor of the evaluation unit further configured to provide a correction signal depending on a position of the determined obstacle within the environment of the motor vehicle, wherein the correction signal is provided to activate a steering system or a brake system of the motor vehicle.

14. The motor vehicle of claim 11, wherein the illumination device further comprises:
a shared light source configured to generate the first light beam bundle in the first operating mode and the second light beam bundle in the second operating mode.

15. A method for operating an illumination device of a motor vehicle, comprising:
- generating, by the illumination device in a first operating mode, a first light beam bundle having a first light distribution for illuminating an environment of the motor vehicle and for displaying a first measurement pattern onto the environment;
- generating, by the illumination device in a second operating mode, a second light beam bundle having a second light distribution for displaying a second measurement pattern onto the environment;
- providing, by a control device to a point-to-point controllable light modulation unit, an image signal based on a control pattern;
- activating, by the control device, the first operating mode or the second operating mode, based on the image signal; and
- forming, by the point-to-point controllable light modulation unit, a resulting light pattern from the first light beam bundle in the first operating mode or the second light beam bundle in the second operating mode from a plurality of individually adjustable beams correlated with a respective pixel of the control pattern,
- wherein the generating of the first light beam bundle or the second light beam bundle comprises periodically alternately activating, by the control device, the first operating mode and the second operating mode, and
- wherein the displaying, by the point-to-point controllable light modulation unit, of the first measurement pattern or the second measurement pattern comprises forming the first measurement pattern inversely to the second measurement pattern.

16. The method of claim 15, further comprising:
- capturing, by an image detection unit, image data depending on the environment of the motor vehicle illuminated by the first light beam bundle or by the second light beam bundle.

17. The method of claim 16, wherein the image data is an image sequence synchronized with the first operating mode or with the second operating mode.

18. The method of claim 15, wherein the first measurement pattern or the second measurement pattern is a striped pattern or a lattice pattern.

* * * * *